United States Patent
He et al.

(10) Patent No.: US 9,641,360 B2
(45) Date of Patent: May 2, 2017

(54) PREFERENTIAL ALLOCATION OF DIFFERENT LENGTH SCRAMBLING CODES

(75) Inventors: Ning He, Sollentuna (SE); Stephen J. Grant, Pleasanton, CA (US); Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1305 days.

(21) Appl. No.: 13/163,270

(22) Filed: Jun. 17, 2011

(65) Prior Publication Data

US 2012/0188951 A1   Jul. 26, 2012

Related U.S. Application Data (60) Provisional application No. 61/436,359, filed on Jan. 26, 2011.

(51) Int. Cl.
| | |
|---|---|
| *H04W 4/00* | (2009.01) |
| *H04L 25/03* | (2006.01) |
| *H04L 27/26* | (2006.01) |
| *H04W 72/04* | (2009.01) |
| *H04W 88/12* | (2009.01) |

(52) U.S. Cl.
CPC ..... *H04L 25/03866* (2013.01); *H04W 72/048* (2013.01); *H04L 27/2655* (2013.01); *H04W 72/0466* (2013.01); *H04W 88/12* (2013.01)

(58) Field of Classification Search
None
See application file for complete search history.

(56) References Cited

U.S. PATENT DOCUMENTS

| | | | | |
|---|---|---|---|---|
| 6,724,813 | B1* | 4/2004 | Jamal et al. | 375/219 |
| 2003/0156564 | A1* | 8/2003 | Frerking et al. | 370/336 |
| 2010/0214952 | A1* | 8/2010 | Gallagher et al. | 370/254 |

FOREIGN PATENT DOCUMENTS

| | | | | |
|---|---|---|---|---|
| EP | 1626514 A1 * | 2/2006 | | H04J 13/00 |
| WO | 00/22866 | 4/2000 | | |

OTHER PUBLICATIONS

Alam, "Simulation of Third Generation CDMA Systems", Virginia Polytechnic Instiitute & State University, pp. 1-75.*

(Continued)

*Primary Examiner* — Nicholas Sloms
(74) *Attorney, Agent, or Firm* — Coats & Bennett, PLLC (57) ABSTRACT

A base station herein assists a radio network controller (RNC) to allocate scrambling codes in a cell. The base station's assistance advantageously permits the RNC to allocate different length scrambling codes to different mobile terminals (or downlink carriers) in the cell. Specifically, the base station determines a preference for whether the length of a scrambling code to be allocated to each terminal or carrier should be short or long, based on whether uplink communications transmitted by the terminal, or downlink communications transmitted over the carrier, are to be processed with a high-complexity receiver or a low-complexity receiver. The RNC receives these preferences from the base station and takes them into account in order to allocate either a short scrambling code or a long scrambling code to each terminal or downlink carrier in the cell. The RNC then propagates the scrambling code allocations throughout the cell.

19 Claims, 7 Drawing Sheets

(56) References Cited

OTHER PUBLICATIONS

Dahlman, E. et al. "WCDMA—The Radio Interface for Future Mobile Multimedia Communications." IEEE Transactions on Vehicular Technology, vol. 47, No. 4, Nov. 1998.
3rd Generation Partnership Project. "Baseline Material for the Proposed Update of Section 5-1-1 Toward Rev. 10 of Rec. IT-R M.1457." 3GPP TSG-RAN WG2 Ad hoc meeting #10-02, R4-101454, Dublin, Ireland, Apr. 12-16, 2010.
Ericsson, "Short scrambling codes for the UTRA/FDD uplink", TSG-RAN Working Group 1 meeting #4, Shin-Yokohama, Japan, Apr. 18-20, 1999, R1-99333.
3GPP Draft; 25.213 V10.0.0, Technical Specification Group Radio Access Network; Spreading and modulation (FDD) (Release 10), Sophia-Antipolis Cedex, France, Sep. 28, 2010.
3GPP, Technical Specification Group (TSG) Radio Access Network (RAN); Working Group 1 (WG1); Spreading and modulation (FDD), V2.1.2 (Apr. 1999).
SK Telecom, Text Proposal for TR 25.839 V0.3.1, TSG-RAN WG3 meeting #23, Helsinki, Finland, Sep. 3, 2001, R3-012497.

\* cited by examiner

PREFERENTIAL ALLOCATION OF DIFFERENT LENGTH SCRAMBLING CODES

RELATED APPLICATIONS

This application claims priority from U.S. Provisional Patent Application No. 61/436,359, which was filed on 26 Jan. 2011 and is incorporated herein by reference in its entirety.

BACKGROUND

Many wireless communication systems, including those based on the Universal Mobile Telecommunications System (UMTS), employ scrambling codes. Scrambling codes (e.g., Gold codes) have pseudo-random characteristics and generally serve to distinguish the transmissions of one source from those of another source. For example, a radio network controller allocates different scrambling codes to different mobile terminals located in the same service area (i.e., cell). Allocated in this way, the scrambling codes distinguish the uplink communications transmitted by one mobile terminal from the uplink communications transmitted by another mobile terminal. Likewise, the radio network controller allocates different scrambling codes to different cells, in order to distinguish the downlink communications transmitted in one cell from the downlink communications transmitted in another cell.

Multi-carrier systems extend the use of scrambling codes to multiple carriers within the same cell. In a multi-carrier system, two or more separately modulated carriers in distinct frequency bands are simultaneously used to carry communications in a cell. Depending on the particular type of multi-carrier system, multiple carriers can be employed for carrying downlink communications, uplink communications, or both. In the downlink context, a radio network controller may allocate one scrambling code to each of multiple downlink carriers in the cell, where different downlink carriers may be allocated the same or different scrambling codes. In the uplink context, the radio network controller may allocate one or more scrambling codes to each of multiple mobile terminals in the cell, where different uplink carriers transmitted by any given mobile terminal may use the same or different scrambling codes.

The length of scrambling codes is conventionally quite long in order to better distinguish transmission sources from one another. In systems based on UMTS, for instance, the long scrambling code length is 38,400 chip periods, or equivalently one 10 millisecond radio frame. This long length advantageously serves to randomize any interference between different scrambling codes that might otherwise result due to periodic code cross correlation peaks.

At the same time, however, a long scrambling code length significantly contributes to the high complexity of advanced receivers (e.g., multi-user detection receivers in the uplink and multi-code/multi-stream detection receivers in the downlink). Indeed, such advanced receivers compute the cross correlations amongst many scrambling codes at many chip lags and many symbol lags. Because these cross correlations vary every symbol period, and because the long scrambling code length practically prohibits pre-computation of all required cross correlations, the receivers must compute the cross correlations at run-time. This computational burden frustrates the use of advanced receivers, despite their importance to the achievement of high data rates in wireless communication systems.

SUMMARY

Teachings herein include a base station configured to assist a radio network controller (RNC) in its allocation of scrambling codes. The base station's assistance advantageously permits the RNC to allocate different length scrambling codes to different mobile terminals (or downlink carriers) in the same cell depending on the type of receiver with which communications transmitted by the mobile terminal (or over the carrier) are to be processed. By allocating short scrambling codes for communications to be received with high-complexity receivers, the run-time computational complexity of those receivers can be reduced. At the same time, by allocating long scrambling codes for communications to be received with low-complexity receivers, the teachings retain interference randomization benefits for those receivers.

More particularly, processing performed by a base station for assisting the RNC to allocate scrambling codes includes determining, for each of one or more mobile terminals or downlink carriers in a cell, a preference for whether the length of a scrambling code to be allocated to that mobile terminal or carrier should be short or long. The determination of a short or long code length preference for each mobile terminal or downlink carrier is advantageously based on whether uplink communications transmitted by the mobile terminal, or downlink communications transmitted over the carrier, are to be processed with a high-complexity receiver or a low-complexity receiver. Processing continues with sending control signaling indicating the code length preferences to the RNC.

Note that the base station may logically classify different receivers as being either high complexity or low complexity for making code length preference determinations. At least in some embodiments, for example, the extent to which a receiver employs cross correlations amongst scrambling codes serves as a point of distinction between high complexity and low-complexity receivers.

Furthermore, in making the code length preference determinations, the base station may in some embodiments determine whether uplink or downlink communications are to be processed with a high-complexity receiver or low-complexity receiver based on the general receiver capabilities of the node that will receive those communications (i.e., the base station itself in the case of uplink communications, or a mobile terminal in the case of downlink communications). In other embodiments, the base station determines whether uplink or downlink communications are to be processed with a high-complexity receiver or low-complexity receiver based not only on the general receiver capabilities of the receiving node, but also on the current availability of receiver resources at the receiving node. Indeed, even if the receiving node is generally capable of processing communications with a high-complexity receiver, the node at any given time may not have sufficient receiver resources (e.g., hardware or software) for such processing.

Regardless of precisely how the base station determines its code length preferences, the RNC is configured to take the code length preferences into account in order to allocate either a short scrambling code or a long scrambling code to each mobile terminal or downlink carrier in the cell. In this regard, processing performed by the RNC includes receiving from the base station control signaling indicating, for each of one or more mobile terminals or downlink carriers in the cell, a preference for whether the length of a scrambling code to be allocated to that mobile terminal or carrier should be short or long. Processing continues with allocating either a short scrambling code or a long scrambling code to each mobile terminal or downlink carrier, taking into account a corresponding one of those preferences.

In some embodiments, the RNC takes into account the code length preference received for a mobile terminal or carrier in the sense that the RNC may, but is not required to, allocate a scrambling code to the terminal or carrier with the code length preferred by the base station. In other embodiments, the RNC is required to allocate a scrambling code to the terminal or carrier with the code length preferred by the base station.

Once the RNC has allocated scrambling codes as described above, processing at the RNC finally includes sending for propagation in the cell control signaling indicating the scrambling code allocated to each mobile terminal or downlink carrier. The RNC may for instance send such control signaling to the base station and/or mobile terminal over a higher layer downlink control channel.

According to certain variations herein, the base station determines a code length preference for a mobile terminal or downlink carrier based not only on the complexity of the receiver that is to be used to process communications transmitted by the terminal, or over the carrier, but also based (directly or indirectly) on the data rate at which those communications are to be transmitted. In general, if communications are to be transmitted by a terminal, or over a carrier, at a high data rate and are to be received with a high-complexity receiver, the base station determines that the terminal or carrier should preferably be allocated a short scrambling code. Otherwise, e.g., if communications are to be transmitted by the terminal, or over the carrier, at a low data rate and are to be received with a low-complexity receiver, the base station determines that the terminal or carrier should preferably be allocated a long scrambling code.

According to other variations, the base station determines not only a preference for whether the length of a scrambling code should be short or long, but also a preference for the particular scrambling code to be allocated by the RNC. The base station determines this preference based on minimizing peaks in cross-correlations amongst the short scrambling codes allocated in the cell.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
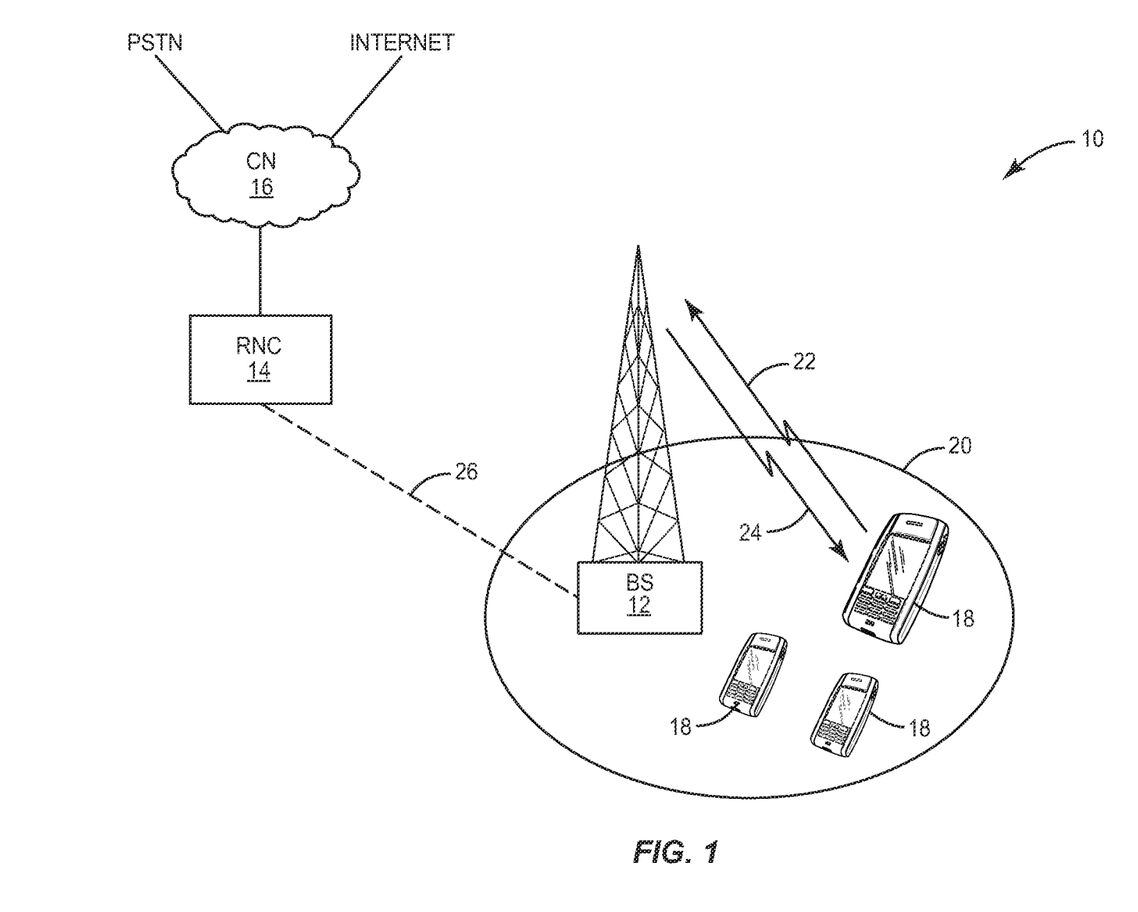
FIG. 1 is a block diagram of a wireless communication system that includes a base station and a radio network controller (RNC) according to one or more embodiments herein.

FIG. 1 depicts a simplified example of a wireless communication system 10 according to one or more embodiments. As shown, the system 10 includes a base station 12, a radio network controller (RNC) 14, and a core network (CN) 16.

The base station 12 contains radio equipment for serving one or more mobile terminals 18 in a cell 20. The base station 12, or other base stations not shown, may also serve other mobile terminals in other cells. Regardless, in some embodiments, communications from the mobile terminals 18 to the base station 12 (i.e., uplink communications 22) and/or communications from the base station 12 to the mobile terminals 18 (i.e., downlink communications 24) are carried over a modulated carrier in a certain frequency band. In other embodiments, uplink and/or downlink communications are each carried over two or more separately modulated carriers in distinct frequency bands.

The RNC 14 may be geographically separated from the base station 12 and communicates with the base station 12 over a backhaul link 26. Though separated from the base station 12, the RNC 14 actually manages the radio resources used for communications 22, 24 between the base station 12 and the mobile terminals 18 in the cell 20. The CN 16 communicatively couples the RNC 14 to other systems, such as the Public Switched Telephone Network (PSTN), the Internet, and the like.

As part of radio resource management, the RNC 14 allocates scrambling codes in the cell 20. Scrambling codes (e.g., Gold codes) have pseudo-random characteristics and generally serve to distinguish the transmissions of one source from those of another source.

For the uplink, the RNC 14 is configured to allocate a different scrambling code to different mobile terminals 18 in the cell 20, in order to distinguish the uplink communications 22 transmitted by one mobile terminal 18 from the uplink communications 22 transmitted by another mobile terminal 18. In some embodiments, the uplink communications 22 of a mobile terminal 18 are carried by multiple uplink carriers. In that case, the RNC 14 may allocate the mobile terminal 18 one or more scrambling codes, where different uplink carriers may use the same or different scrambling codes.

For the downlink, the RNC 14 is configured to allocate a different scrambling code to different cells, in order to distinguish the downlink communications transmitted in one cell from the downlink communications transmitted in another cell. With regard to a given cell 20, though, the RNC 14 is more particularly configured to allocate a scrambling code to each of one or more downlink carriers in that cell 20. In some embodiments, there are multiple downlink carriers in the cell 20. In this case, one of the carriers may always be transmitted and therefore be designated as a primary (i.e., anchor) carrier, while other carriers may be dynamically activated/deactivated as needed and be considered secondary (i.e., component) carriers. Regardless, the RNC 14 may allocate the same or different scrambling codes to different downlink carriers.

According to advantageous embodiments herein, the base station 12 is configured to assist the RNC 14 in its allocation of scrambling codes. With the base station's assistance, the RNC 14 may in some cases strategically allocate different length scrambling codes to different mobile terminals 18 (or downlink carriers) in the cell 20, depending on the type of receiver with which communications transmitted by the terminal 18 (or over the carrier) are to be processed. The different length scrambling codes may comprise, for instance, short scrambling codes of approximately 256 chip periods and long scrambling codes of approximately 38,400 chip periods (or, in general, long scrambling codes that are on the order of 100 to 200 times longer than short scrambling codes, in terms of chip periods, seconds, or the like). Regardless of the particular relation between short and long scrambling codes, though, by allocating short scrambling codes for communications to be received in the cell 20 with high-complexity receivers, the run-time computational complexity of those receivers is reduced. Indeed, such receivers can employ a stored look-up table of pre-computed cross-correlations amongst short scrambling codes rather than having to compute those cross-correlations at run-time. At the same time, by allocating long scrambling codes for communications to be received in the cell 20 with low-complexity receivers, interference randomization benefits for those receivers is retained.

Figure 2:
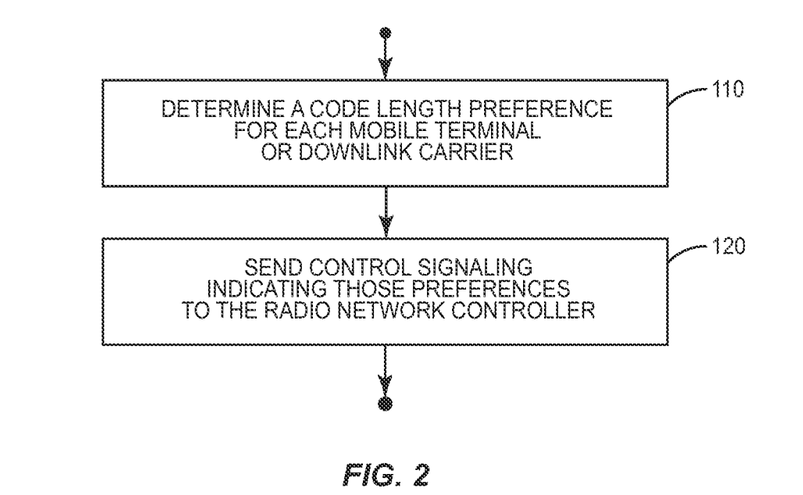
FIG. 2 is a logic flow diagram illustrating a method implemented by the base station in FIG. 1, according to at least one embodiment.

More specifically, FIG. 2 illustrates processing performed by the base station 12 for assisting the RNC 14 to allocate scrambling codes. Processing includes determining, for each of one or more mobile terminals 18 or downlink carriers in the cell 20, a preference for whether the length of a scrambling code to be allocated to that mobile terminal 18 or carrier should be short or long (Block 110). For convenience, such a preference is referred to herein as a code length preference. As suggested above, the determination of a short or long code length preference for each mobile terminal 18 or downlink carrier is advantageously based on whether uplink communications transmitted by the mobile terminal 18, or downlink communications transmitted over the carrier, are to be processed with a high-complexity receiver or a low-complexity receiver.

In this regard, the base station 12 may logically classify different receivers as being either high complexity or low complexity for making code length preference determinations. At least in some embodiments, for example, the extent to which a receiver employs cross correlations amongst scrambling codes serves as a point of distinction between high complexity and low-complexity receivers. The base station 12 in this case may thus classify multi-user detection receivers, multi-code detection receivers, interference cancelling receivers, and other such code-specific receivers as high-complexity receivers, while classifying other, more conventional receivers (e.g., RAKE receivers) as low-complexity receivers.

Furthermore, in making the code length preference determinations, the base station 12 may determine whether uplink or downlink communications are to be processed with a high-complexity receiver or low-complexity receiver based on the general receiver capabilities of the node that will receive those communications (i.e., the base station 12 itself in the case of uplink communications, or a mobile terminal 18 in the case of downlink communications). Specifically, the base station 12 in some embodiments determines that the uplink or downlink communications are to be processed with a high-complexity receiver if the receiving node has the capability to process communications with a high-complexity receiver. Conversely, the base station 12 determines that the uplink or downlink communications are to be processed with a low-complexity receiver if the receiving node only has the capability to process communications with a low-complexity receiver.

In other embodiments, the base station 12 determines whether uplink or downlink communications are to be processed with a high-complexity receiver or low-complexity receiver based not only on the general receiver capabilities of the receiving node, but also on the current availability of receiver resources at the receiving node. Indeed, even if the receiving node is generally capable of processing communications with a high-complexity receiver, the node at any given time may not have sufficient receiver resources (e.g., hardware or software) for such processing. Thus, in at least one embodiment, the base station 12 determines that uplink or downlink communications are to be processed with a high-complexity receiver if the receiving node has both the capability to process communications with a high-complexity receiver and sufficient receiver resources available to actually process the uplink or downlink communications with a high-complexity receiver.

In the case of uplink communications, the base station 12 itself is the receiving node and thus advantageously has inherent knowledge about the complexity of the receiver it will employ to process those communications (i.e., its receiver capabilities and receiver resource availability). The base station 12 may inherently know, for example, that it will process uplink communications transmitted by one terminal 18 with a high-complexity receiver and, because there are insufficient receiver resources available, process uplink communications transmitted by a different terminal 18 with a low-complexity receiver. In this case, the base station 12 may determine different code length preferences for different terminals 18.

In the case of downlink communications, each mobile terminal 18 is a receiving node. Thus, the base station 12 may receive feedback that directly or indirectly indicates whether each terminal 18 will process the downlink communications transmitted over a downlink carrier with a high-complexity receiver or a low-complexity receiver. The base station 12 in at least some embodiments, for example, determines a long code length preference for a downlink carrier that will be processed by those mobile terminals 18 indicated by the feedback as being capable of receiving communications with a low-complexity receiver. Such a downlink carrier in some embodiments comprises a primary or anchor carrier, meaning that even legacy mobile terminals 18 (which have a low-complexity receiver and/or are incapable of using short scrambling codes) may still access the system 10. Conversely, the base station 12 in these embodiments determines a short code length preference for a downlink carrier that will be processed by those mobile terminals 18 indicated by the feedback as being capable of receiving communications with a high-complexity receiver (and as having sufficient receiver resources available for such high complexity processing). Such a downlink carrier may comprise a secondary or component carrier, and may in at least one embodiment be dynamically activated responsive to determining that at least a threshold number of mobile terminals 18 in the cell 20 have a high-complexity receiver.

Irrespective of the modifications and/or variations just described, processing in FIG. 2 finally continues with sending control signaling indicating the code length preferences to the RNC 14 (Block 120). The control signaling may indicate code length preferences either directly or indirectly. For example, the signaling may directly indicate code length preferences using indicators dedicated to indicating either a "long" code length preference or a "short" code length preference. Alternatively, the signaling may indirectly indicate a short code length preference or a long code length preference by actually indicating that the associated communications will be processed with a high-complexity receiver or a low-complexity receiver.

Moreover, the control signaling may indicate code length preferences explicitly for all terminals 18 or carriers, or may indicate at least some of the preferences implicitly. For example, in some embodiments, the control signaling explicitly indicates a short code length preference for some mobile terminals 18 or carriers, and implicitly indicates a long code length preference for all other terminals 18 or carriers that are not explicitly indicated as having a short code length preference.

Finally, the control signaling may include either absolute or relative indications of code length preferences. In embodiments with absolute indications, the base station 12 signals a short or long code length preference for each terminal 18 or carrier, during each of multiple different time periods. By contrast, in embodiments with relative indications, the base station 12 only signals changes in the code length preference for a terminal 18 or carrier relative to a previous time period. These latter embodiments involve less control signaling, as no control signaling needs to be sent for a terminal 18 or carrier when the code length preference for the current time period has not changed since the last time period.

However signaled, though, the RNC 14 is configured to take the code length preferences into account in order to allocate either a short scrambling code or a long scrambling code to each mobile terminal 18 or downlink carrier.

Figure 3:
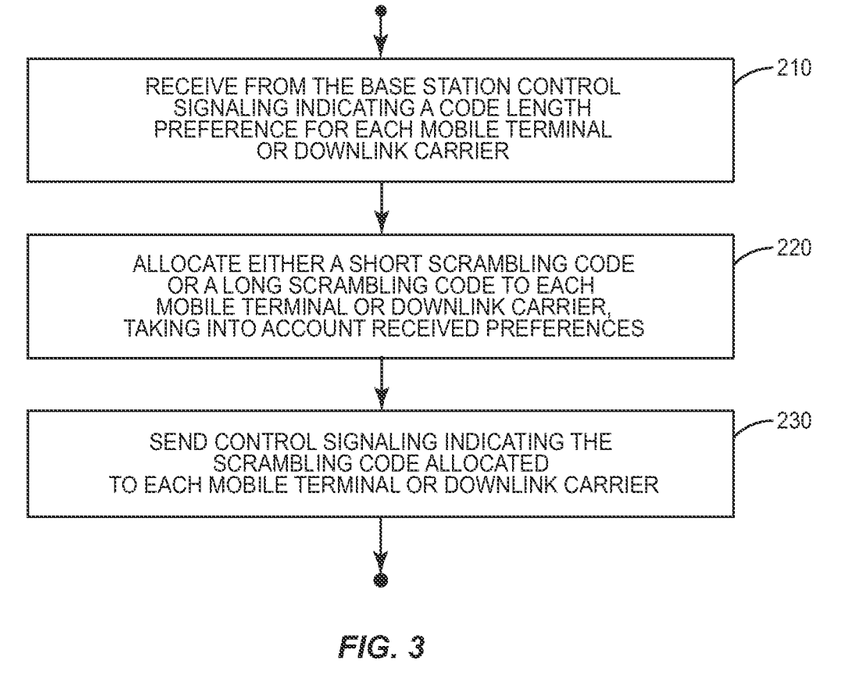
FIG. 3 is a logic flow diagram illustrating a method implemented by the RNC in FIG. 1, according to at least one embodiment.

In this regard, FIG. 3 illustrates processing performed by the RNC 14 for allocating scrambling codes with assistance from the base station 12. As shown in FIG. 3, the RNC 14 receives from the base station 12 control signaling indicating, for each of one or more mobile terminals 18 or downlink carriers in the cell 20, a preference for whether the length of a scrambling code to be allocated to that mobile terminal 18 or carrier should be short or long (Block 210). Processing continues with allocating either a short scrambling code or a long scrambling code to each mobile terminal 18 or downlink carrier, taking into account a corresponding one of those preferences (Block 220).

In some embodiments, the RNC 14 takes into account the code length preference received for a mobile terminal 18 or carrier in the sense that the RNC 14 may, but is not required to, allocate a scrambling code to the terminal 18 or carrier with the code length preferred by the base station 12. The RNC 14 may, for instance, just consider the received code length preference as one of a number of factors in ultimately determining the best code length for the terminal 18 or carrier. In other embodiments, the RNC 14 is required to allocate a scrambling code to the terminal 18 or carrier with the code length preferred by the base station 12.

Regardless, the RNC 14 in at least one embodiment allocates a scrambling code to the terminal 18 or carrier by selecting one of a plurality of scrambling codes included in a set of available (i.e., candidate) scrambling codes. Specifically, if the RNC 14 is to allocate a long scrambling code to the terminal 18 or carrier, the RNC 14 selects that code from a set of long scrambling codes. On the other hand, if the RNC 14 is to allocate a short scrambling code to the terminal 18 or carrier (e.g., in accordance with the preferred code length indicated by the base station 12), the RNC 14 selects that code from a set of short scrambling codes. This set of short scrambling codes, in some embodiments, is cell-specific in the sense that it includes at least some short scrambling codes that are not common to any other set of short scrambling codes used by other cells (e.g., in the entire system 10 or at least in the vicinity of the cell 20). By employing different cell-specific sets of short scrambling codes, the RNC 14 may coordinate short scrambling codes amongst a number of cells, to ensure that short scrambling codes are not re-used by different terminals or carriers in neighboring cells.

Once the RNC 14 has allocated scrambling codes as described above, processing at the RNC 14 finally includes sending for propagation in the cell 20 control signaling indicating the scrambling code allocated to each mobile terminal 18 or downlink carrier (Block 220). The RNC 14 may for instance send such control signaling to the base station 12 and/or mobile terminal 18 over a higher layer downlink control channel.

Note that the RNC 14 performs the above processing for allocating scrambling codes in a cell 20 served by a base station 12 that is configured to signal code length preferences to the RNC 14. The RNC 14 may however also perform processing for allocating scrambling codes in another cell (not shown) served by a legacy base station (i.e., a base station that is not configured to signal code length preferences to the RNC 14). In this case, the RNC 14 may interpret the lack of signaling from a legacy base station as a preference for long scrambling codes or may simply allocate long scrambling codes in the cell by default. The RNC 14 thereby maintains backwards compatibility with legacy base stations that may not be capable of employing short scrambling codes.

Returning now to the processing performed by a base station 12 configured to signal code length preferences to the RNC 14, the base station 12 may base the determination of code length preferences on one or more other factors, in addition to receiver complexity. In some embodiments, for example, the base station 12 further bases the determination on transmitter capability, e.g., in terms of the data rate supported by the transmitting node (which is the base station itself in the downlink case, or a mobile terminal in the uplink case). More specifically, the base station 12 determines a code length preference for a mobile terminal 18 or downlink carrier based not only on the complexity of the receiver that is to be used to process communications transmitted by the terminal 18, or over the carrier, but also based (directly or indirectly) on the data rate at which those communications are to be transmitted. In general, if communications are to be transmitted by a terminal 18, or over a carrier, at a high data rate and are to be received with a high-complexity receiver, the base station 12 determines that the terminal 18 or carrier should preferably be allocated a short scrambling code. Otherwise, e.g., if communications are to be transmitted by the terminal 18, or over the carrier, at a low data rate and are to be received with a low-complexity receiver, the base station 12 determines that the terminal 18 or carrier should preferably be allocated a long scrambling code.

Whether the data rate is high or low may, in at least some embodiments, depend on the data rate's relation to a threshold data rate. For instance, if the data rate is below the threshold, the data rate is low. If the data rate is above the threshold, the data rate is high. The boundary condition where the data rate is equal to the threshold may be predefined as desired, e.g., to be low or high. Regardless, this threshold may be set in order to maintain a robust quality of transmission for a particular service; in this regard, different thresholds may be set for different services (e.g., one threshold for voice services and another threshold for data services). Additionally or alternatively, the threshold may be set based on the receiver's ability or capacity to handle different terminals with different data rate requirements.

In some embodiments, the base station's code length preference determination is based directly on data rate. In this case, the base station 12 logically classifies the data rate at which communications will be transmitted as being either high or low, and directly bases the code length preference determination on that classification.

In other embodiments, the base station's code length preference determination is based only indirectly on data rate. Indeed, whether communications are to be transmitted at a low data rate or a high data rate may, at least in part, actually depend on the type of those communications. The communications may comprise, for example, circuit switched data or packet switched data, machine type communications (for machine-to-machine communications) or non-machine type communications, etc. If communications transmitted by a mobile terminal 18, or over a carrier, comprise circuit switched data and/or machine type communications (indicating that the communications will be transmitted with a low data rate) and the communications are to be processed with a low-complexity receiver, the base station 12 determines that the terminal 18 or carrier should preferably be allocated a long scrambling code. Conversely, if communications transmitted by a mobile terminal 18, or over a carrier, comprise packet switched data and/or non-machine type communications (indicating that the communications will be transmitted with a high data rate) and the communications are to be processed with a high-complexity receiver, the base station 12 determines that the terminal 18 or carrier should preferably be allocated a short scrambling code.

With particular regard to the uplink case, the base station 12 may receive feedback from the mobile terminal 18 indicating whether uplink communications transmitted by the terminal 18 are to be transmitted at a high data rate or a low data rate. In some embodiments, for instance, the feedback actually indicates the specific data rate at which uplink communications are to be transmitted by the terminal 18, while in other embodiments the feedback just generally indicates whether the data rate is high or low. In still other embodiments, the feedback indicates the type of the uplink communications (e.g., as circuit-switched or packet switched, machine type communications or non-machine type communications).

In yet other embodiments, the feedback indicates whether or not the mobile terminal 18 supports and requires a higher data rate in order to empty the terminal's data buffer within a predefined time period. Such feedback according to High Speed Packet Access (HSPA) standards, for example, comprises a so-called 'happy' bit because it indicates whether or not the terminal is 'happy' with its current serving grant (or serving data rate). Regardless of the particular standard, though, if the feedback indicates that the mobile terminal 18 supports and requires a higher data rate, and the terminal's uplink communications are to be processed with a high-complexity receiver, the base station 12 determines that the terminal 18 should preferably be allocated a short scrambling code. Otherwise, the base station 12 determines that the terminal 18 should preferably be allocated a long scrambling code.

In some embodiments, the feedback indicates a transport format used by the mobile terminal 18. This transport format represents a payload size and modulation and coding scheme used by the mobile terminal 18, and thus indirectly indicates a data rate used by the terminal 18. If the transport format corresponds to a high data rate, and the terminal's uplink communications are to be processed with a high-complexity receiver, the base station 12 determines that the terminal 18 should preferably be allocated a short scrambling code. Otherwise, the base station 12 determines that the terminal 18 should preferably be allocated a long scrambling code.

In still other embodiments, the feedback indicates a buffer status of the mobile terminal in terms of how much data the mobile terminal currently has in its transmit buffer. Additionally or alternatively, the feedback indicates the power headroom of the mobile terminal.

Notably, the base station 12 may receive the feedback described above from time to time, and may therefore dynamically update its code length preference determination for a terminal 18 responsive to changes in that feedback. In one or more embodiments, for example, a mobile terminal 18 transmits uplink communications to the base station 12 in the context of a session established for that terminal 18. During this session, the amount of data in the terminal's buffer, the terminal's channel conditions, the terminal's available transmit power, and the like may vary. This means that the data rate at which uplink communications are to be transmitted by the terminal 18 may change between high and low within the session. Correspondingly, the terminal 18 may send, and the base station 12 may receive, updated feedback within the session that indicates a change in the data rate at which the uplink communications are to be transmitted. Responsive to receiving this updated feedback, the base station 12 dynamically updates its code length preference determination for the terminal 18 and signals that update to the RNC 14. Accordingly, within any given session the RNC 14 may dynamically switch between allocating a short scrambling code to a terminal 18 and allocating a long scrambling code to the terminal 18.

Alternatively or additionally to transmitter capability (i.e., data rate), the base station 12 may base the determination of code length preferences on still one or more other factors, in addition to receiver complexity. One such factor includes the load of the system 10. In the downlink case, for example, the base station 12 may determine a long code length preference for a downlink carrier if the system load is high, even if some mobile terminals 18 in the cell have the capability to process that downlink carrier with a high-complexity receiver (and sufficient receiver resources available to do so). Indeed, if the system load is high, the base station 12 may not be able to transmit a downlink carrier that uses a short scrambling code.

Likewise in the uplink case, the base station 12 may determines a long code length preference for a mobile terminal 18 if the system load is high, even if the base station 12 has the capability to process uplink communications from the terminal 18 with a high-complexity receiver (and sufficient receiver resources available to do so). As one example, if the system load is high, the base station 12 may not be able to grant a high data rate to a sufficient number of terminals 18 to justify the use of a high-complexity receiver and short scrambling codes.

In the embodiments described above, the base station 12 assists the RNC 14 in its allocation of a scrambling code by intelligently determining a preference for whether the length of that scrambling code should be short or long. A code length preference in this context simply indicates a preference for the scrambling code length, without indicating a preference between different scrambling codes of the same length. The RNC 14 takes into account the preference for scrambling code length and distinguishes between different codes of the same length in order to select the particular scrambling code to be allocated. According to one or more embodiments described below, however, the base station 12 further assists the RNC in this scrambling code selection, by intelligently determining a preference for the particular scrambling code to be selected.

Figure 4:
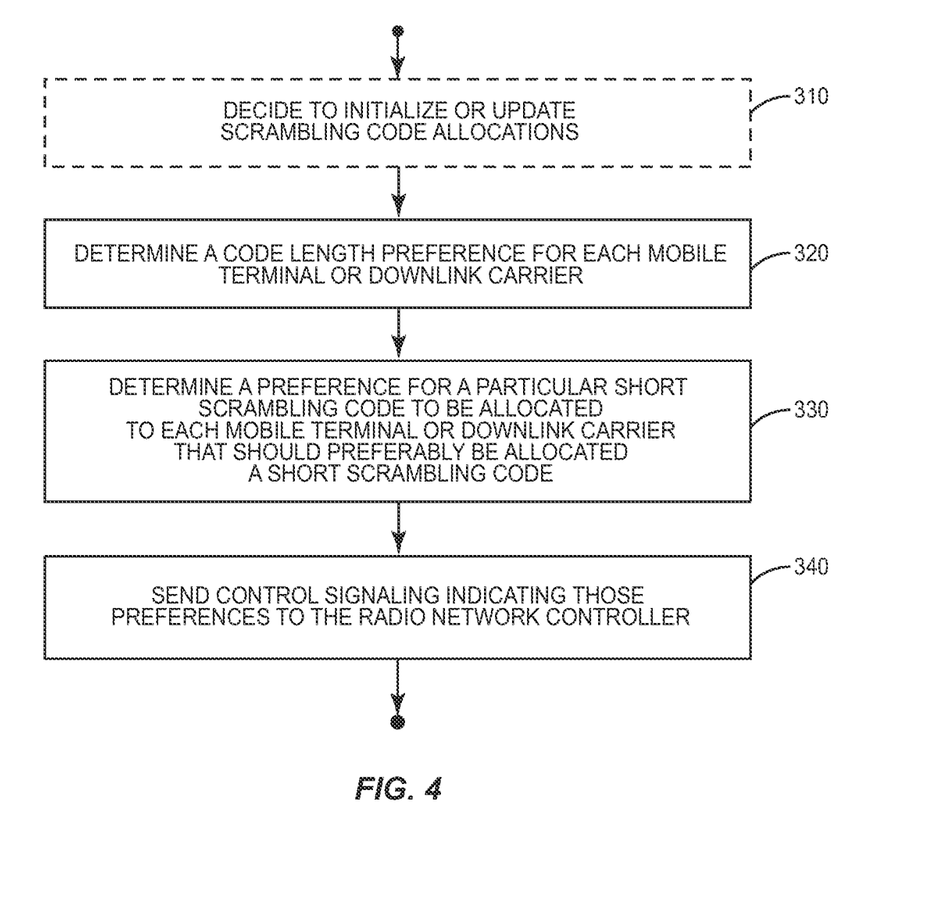
FIG. 4 is a logic flow diagram illustrating a method implemented by the base station in FIG. 1, according to one or more other embodiments.

Consider, for example, the base station processing illustrated in FIG. 4. As shown in FIG. 4, the base station 12 determines a code length preference for each terminal 18 or downlink carrier (Block 320). The base station 12 also determines, for each terminal 18 or downlink carrier that should preferably be allocated a short scrambling code, a preference for a particular short scrambling code to be allocated to the terminal 18 or carrier (Block 330). That is, the base station 12 determines a preference between different short scrambling codes. The base station 12 determines this preference based on minimizing peaks in cross-correlations amongst the short scrambling codes allocated in the cell 20.

In one or more embodiments, for instance, the base station 12 determines the preference for a particular short scrambling code by selecting that code from a cell-specific set of short scrambling codes. The base station 12 may be pre-configured with this set, or may receive the set from the RNC 14. In either case, the base station 12 determines the preferred code by selecting from the set the code that interferes the least with those codes already allocated in the cell 20. Here, the code that interferes the least is the code that has the minimum cross-correlation values with the already allocated codes.

Having determined a code length preference and a particular code preference for each terminal 18 or carrier, the base station 12 sends control signaling indicating those preferences to the RNC 14 (Block 340). As with the code length preferences, the RNC 14 is configured to take the particular code preferences into account when selecting scrambling codes to allocate in the cell 20.

Figure 5:
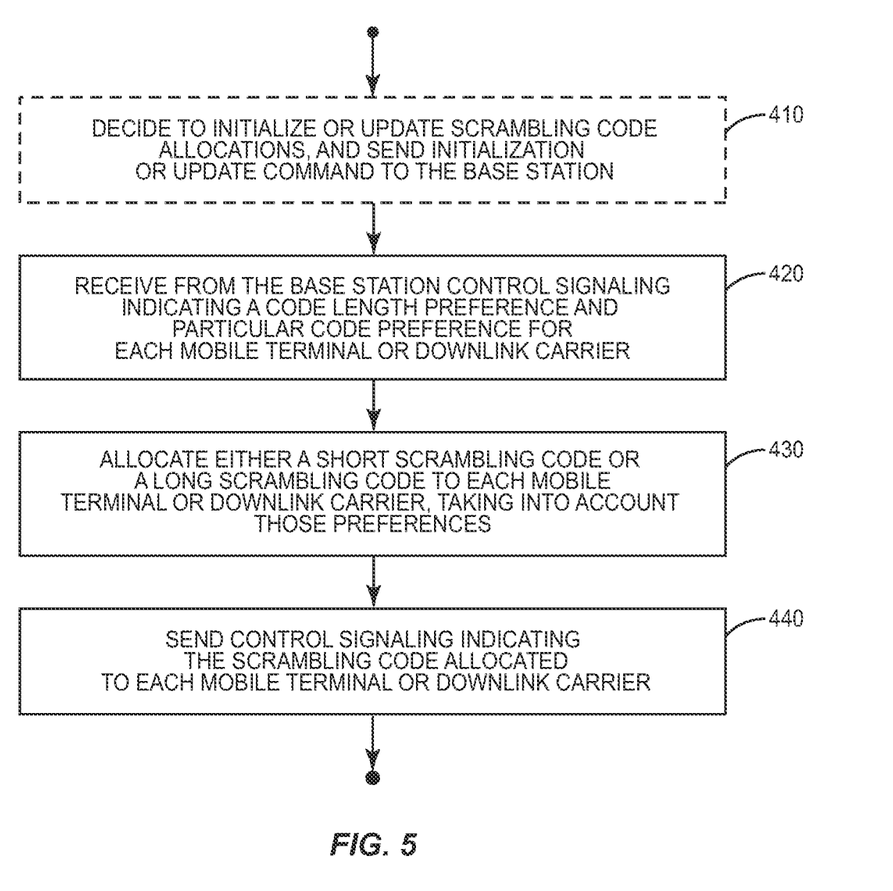
FIG. 5 is a logic flow diagram illustrating a method implemented by the RNC in FIG. 1, according to one or more other embodiments.

In this regard, FIG. 5 illustrates processing performed by the RNC 14. As shown in FIG. 5, the RNC 14 receives from the base station 12 control signaling indicating a code length preference and a particular code preference for each terminal 18 or downlink carrier (Block 420). The RNC 14 then allocates either a short scrambling code or a long scrambling code to each mobile terminal 18 or downlink carrier, taking into account both of those preferences (Block 430). In some embodiments, the RNC 14 takes into account a particular code preference in the sense that the RNC 14 may, but is not required to, allocate the particular scrambling code preferred by the base station 12. The RNC 14 may, for instance, just consider the particular code preference as one of a number of factors in ultimately allocating the best code for a terminal 18 or carrier. In other embodiments, the RNC 14 is required to allocate the scrambling code preferred by the base station 12. Regardless, once the RNC 14 has allocated scrambling codes as described above, processing at the RNC 14 finally includes sending for propagation in the cell 20 control signaling indicating the scrambling code allocated to each mobile terminal 18 or downlink carrier (Block 440).

Note that the above processing performed by the base station 12 and RNC 14 may be performed once in order to initialize scrambling code allocations in the cell 20, and may also be performed from time to time in order to update those allocations. In some embodiments, the decision of when to perform the processing at the base station 12 and RNC 14 is made at the base station 12. As suggested above, a decision to update may be made based upon changes in the available receiver resources, the supportable transmission data rate, the system load, or the like, and may even occur in the middle of a communication session. These embodiments are illustrated in FIG. 4, whereby the base station 12 decides to initialize or update scrambling code allocations (Block 310).

In other embodiments, the decision of when to perform the processing at the base station 12 and RNC 14 is made at the RNC 14. These embodiments are illustrated in FIG. 5, whereby the RNC 14 decides to initialize or update scrambling code allocations and sends a command to the base station 12 to that effect (Block 410). Along with this command, the RNC 14 may also send a cell-specific set of short scrambling codes to the base station 12, from which the base station 12 is to select a preferred scrambling code for each terminal 18 or carrier. In this regard, the RNC 14 may sends different cell-specific sets to different base stations, and thereby coordinate short scrambling code use (and thus interference) amongst a number of cells.

Those skilled in the art will of course appreciate that the processing described above may be performed by any combination of analog and digital circuits, and/or one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 6:
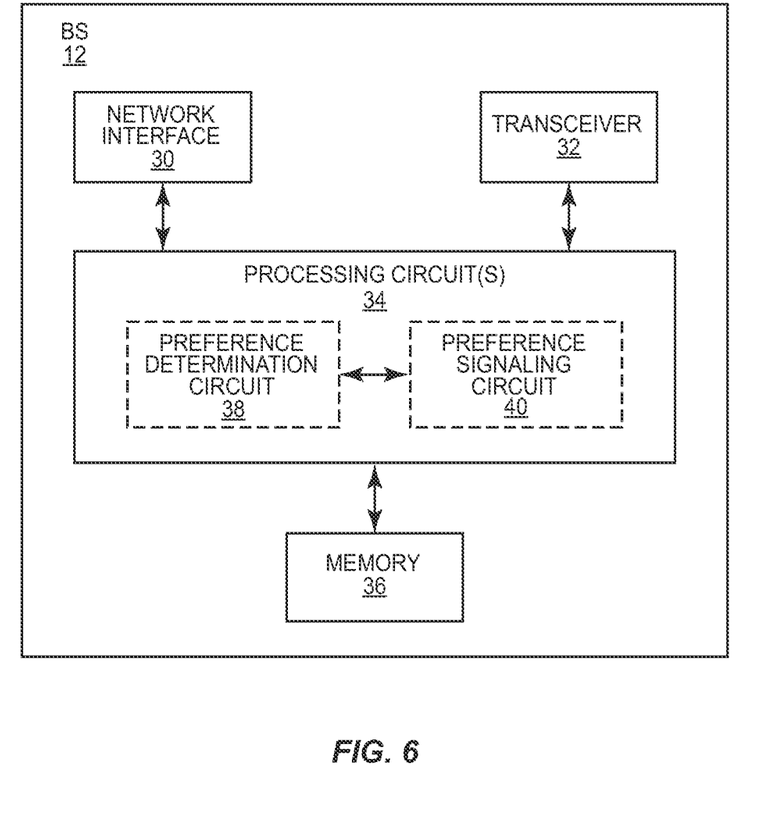
FIG. 6 is a block diagram of the base station in FIG. 1, according to one or more embodiments.

FIG. 6 nonetheless illustrates a simplified example of a base station 12 configured to perform the processing above, according to one or more embodiments. The base station 12 includes a network interface 30, a transceiver 32, one or more processing circuits 34, and a memory 36. The network interface 30 is configured to communicatively couple the base station 12 to the RNC 14, while the transceiver 32 is configured to communicatively couple the base station 12 to the one or more mobile terminals 18. The one or more processing circuits 34 are configured to perform the processing above, in conjunction with the network interface 30, the transceiver 32, and memory 36. The one or more processing circuits 34 may, for example, include a preference determination circuit 38 and a preference signaling circuit 40. The preference determination circuit is configured to determine a code length preference for each terminal 18 or downlink carrier as described above in relation to FIGS. 2 and 4. The preference signaling circuit 40 is correspondingly configured to send control signaling, via the network interface 30, indicating those preferences to the RNC 14. Finally, the memory 36 may store instructions that direct the one or more processing circuits 34 to perform as described above.

Figure 7:
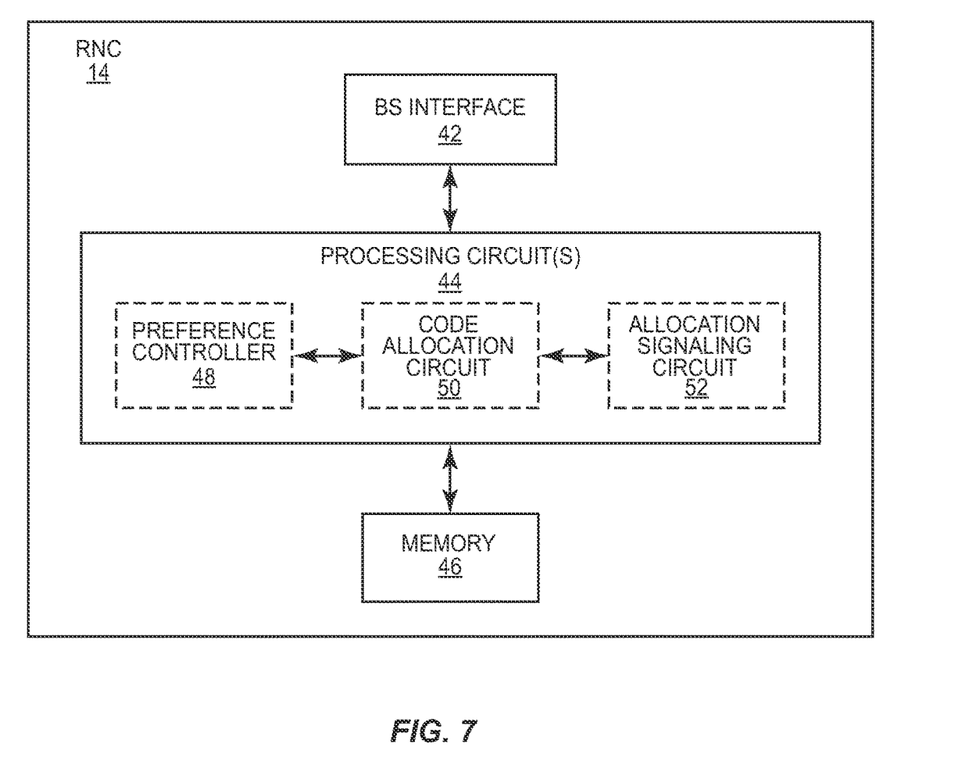
FIG. 7 is a block diagram of the RNC in FIG. 1, according to one or more embodiments.

FIG. 7 illustrates a simplified example of an RNC 14 configured to perform the processing above, according to one or more embodiments. The RNC 14 includes a base station interface 42, one or more processing circuits 44, and a memory 46. The base station interface 42 is configured to communicatively couple the RNC 14 to the base station 12. The one or more processing circuits 44 are configured to perform the processing above in relation to FIGS. 3 and 5, in conjunction with the base station interface 42 and memory 46. The one or more processing circuits 44 may, for example, include a preference controller 48, a code allocation circuit 50, and an allocation signaling circuit 52. The preference controller 48 is configured to receive, via the base station interface 42, control signaling indicating a code length preference for each terminal 18 or downlink carrier. The code allocation circuit 50 is configured to allocate either a short scrambling code or a long scrambling code to each mobile terminal 18 or downlink carrier, taking into account a corresponding one of the preferences received by the preference controller 48. The allocation signaling circuit 52 is configured to send for propagation in the cell 20 control signaling indicating the scrambling code allocated to each mobile terminal 18 or downlink carrier. Finally, the memory 46 may store instructions that direct the one or more processing circuits 44 to perform as described above.

Those skilled in the art will also appreciate that the above embodiments have been described as non-limiting examples, and have been simplified in many respects for ease of illustration. For instance, the above embodiments have not been described in the context of any particular type of wireless communication system 10. In this regard, no particular communication interface standard is necessary for practicing the present invention. That is, the wireless communication system 10 may be any one of a number of standardized system implementations which include an RNC 14 configured to communicate with mobile terminals 18 via a base station 12 that is geographically separated from the RNC 14.

As one particular example, the system 10 may implement HSPA or HSPA Evolution standards as defined by 3GPP. The system 10 may even include features such as Dual or Multi-Carrier HSDPA (High Speed Downlink Packet Access) with Multiple-Input Multiple-Output (MIMO) (Release 9) or Multi-Carrier HSDPA (Release 10). Regardless, such HSPA based standards more specifically refer to the length of a scrambling code as the so-called "type" of that scrambling code. Thus, the type of a scrambling code in HSPA based standards may be long or short according to embodiments herein. Also, the base station 12 and RNC 14 are configured to send control signaling as discussed above over the Iub interface that is standardized for HSPA based systems.

In view of the above modifications and variations, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a base station configured to serve a cell in a wireless communication system, the method comprising:
  determining, for each of one or more mobile terminals or downlink carriers in the cell, a preference for whether the length of a scrambling code to be allocated to that mobile terminal or carrier should be short or long, based on whether uplink communications transmitted by the mobile terminal, or downlink communications transmitted over the carrier, are to be processed with a high-complexity receiver or a low-complexity receiver, wherein a high-complexity receiver is a receiver that is classified by the base station as being of greater complexity than a low-complexity receiver, wherein determining a preference for whether the length of a scrambling code to be allocated to a mobile terminal or downlink carrier should be short or long is directly or indirectly based on whether uplink communications transmitted by the mobile terminal, or downlink communications transmitted over the carrier, are to be:
    transmitted at a high data rate and processed with a high-complexity receiver, in which case the determined preference is for a short scrambling code; or
    transmitted at a low data rate and processed with a low-complexity receiver, in which case the determined preference is for a long scrambling code; and
  sending control signaling indicating said preferences to a radio network controller that is configured to take those preferences into account in order to allocate either a short scrambling code or a long scrambling code to each mobile terminal or downlink carrier, wherein a short scrambling code is shorter in length than a long scrambling code.

2. The method of claim 1, wherein whether uplink communications transmitted by the mobile terminal, or downlink communications transmitted over the carrier, are to be transmitted at a low data rate or a high data rate is based, respectively, on at least one of:
  whether those communications comprise circuit switched data or packet switched data; and
  whether or not those communications comprise machine type communications.

3. The method of claim 1, wherein said determination is made for each mobile terminal, and wherein the method further comprises receiving feedback from each mobile terminal directly or indirectly indicating whether uplink communications transmitted by the mobile terminal are to be transmitted at a low data rate or a high data rate.

4. The method of claim 3, wherein said feedback received from a mobile terminal indicates at least one of:
  a transport format used by the mobile terminal,
  whether or not the mobile terminal supports and requires a higher data rate in order to empty the mobile terminal's data buffer within a predefined time period;
  a buffer status of the mobile terminal; and
  a power headroom of the mobile terminal.

5. The method of claim 3, wherein uplink communications are transmitted by each mobile terminal in the context of a respective session established for that mobile terminal, and wherein the method further comprises dynamically updating said determination for a mobile terminal during the session established for that mobile terminal based on updated feedback received from the mobile terminal explicitly or implicitly indicating a change in the data rate at which uplink communications are to be transmitted by the mobile terminal.

6. The method of claim 1, further comprising determining that said uplink or downlink communications are to be processed with a high-complexity receiver if a node that will receive those communications has both the capability to process communications with a high-complexity receiver and sufficient receiver resources available to actually process said uplink or downlink communications with a high-complexity receiver, and determining that said uplink or downlink communications are to be processed with a low-complexity receiver if the node only has the capability to process communications with a low-complexity receiver.

7. The method of claim 1, wherein said determination is further based on a load of the wireless communication system.

8. The method of claim 1, further comprising determining, for each mobile terminal or downlink carrier that should preferably be allocated a short scrambling code, a preference for a particular short scrambling code to be allocated to the mobile terminal or carrier, based on minimizing peaks in cross-correlations amongst the short scrambling codes allocated in said cell.

9. The method of claim 8, wherein determining a preference for a particular short scrambling code to be allocated to a mobile terminal or carrier comprises selecting that particular short scrambling code from a set of short scrambling codes.

10. The method of claim 1, wherein a high-complexity receiver comprises either a multi-user detection receiver or a multi-code detection receiver.

11. A base station configured to serve a cell in a wireless communication system, the base station comprising a transceiver and one or more processing circuits, wherein the one or more processing circuits are configured to:
   determine, for each of one or more mobile terminals or downlink carriers in the cell, a preference for whether the length of a scrambling code to be allocated to that mobile terminal or carrier should be short or long, based on whether uplink communications transmitted by the mobile terminal, or downlink communications transmitted over the carrier, are to be processed with a high-complexity receiver or a low-complexity receiver, wherein a high-complexity receiver is a receiver that is classified by the base station as being of greater complexity than a low-complexity receiver, wherein the one or more processing circuits are configured to directly or indirectly base the determination of a preference for whether the length of a scrambling code to be allocated to a mobile terminal or downlink carrier should be short or long on whether uplink communications transmitted by the mobile terminal, or downlink communications transmitted over the carrier, are to be:
      transmitted at a high data rate and processed with a high-complexity receiver, in which case the determined preference is for a short scrambling code; or
      transmitted at a low data rate and processed with a low-complexity receiver, in which case the determined preference is for a long scrambling code; and
   send, via said transceiver, control signaling indicating said preferences to a radio network controller that is configured to take those preferences into account in order to allocate either a short scrambling code or a long scrambling code to each mobile terminal or downlink carrier, wherein a short scrambling code is shorter in length than a long scrambling code.

12. The base station of claim 11, wherein whether uplink communications transmitted by the mobile terminal, or downlink communications transmitted over the carrier, are to be transmitted at a low data rate or a high data rate is based, respectively, on at least one of:
   whether those communications comprise circuit switched data or packet switched data; and
   whether or not those communications comprise machine type communications.

13. The base station of claim 12, wherein the one or more processing circuits are configured to make said determination for each mobile terminal, and to receive feedback from each mobile terminal directly or indirectly indicating whether uplink communications transmitted by the mobile terminal are to be transmitted at a low data rate or a high data rate.

14. The base station of claim 13, wherein said feedback received from a mobile terminal indicates at least one of:
   a transport format used by the mobile terminal,
   whether or not the mobile terminal supports and requires a higher data rate in order to empty the mobile terminal's data buffer within a predefined time period;
   a buffer status of the mobile terminal; and
   a power headroom of the mobile terminal.

15. The base station of claim 13, wherein uplink communications are transmitted by each mobile terminal in the context of a respective session established for that mobile terminal, and wherein the one or more processing circuits are further configured to dynamically update said determination for a mobile terminal during the session established for that mobile terminal based on updated feedback received from the mobile terminal explicitly or implicitly indicating a change in the data rate at which uplink communications are to be transmitted by the mobile terminal.

16. The base station of claim 11, wherein the one or more processing circuits are further configured to determine that said uplink or downlink communications are to be processed with a high-complexity receiver if a node receiving those communications has both the capability to process communications with a high-complexity receiver and sufficient receiver resources available to actually process said uplink or downlink communications with a high-complexity receiver, and to determine that said uplink or downlink communications are to be processed with a low-complexity receiver if the node only has the capability to process communications with a low-complexity receiver.

17. The base station of claim 11, wherein the one or more processing circuits are configured to base said determination also on a load of the wireless communication system.

18. The base station of claim 11, wherein the one or more processing circuits are further configured to determine, for each mobile terminal or downlink carrier that should preferably be allocated a short scrambling code, a preference for a particular short scrambling code to be allocated to the mobile terminal or carrier, based on minimizing peaks in cross-correlations amongst the short scrambling codes allocated in said cell.

19. The base station of claim 11, wherein a high-complexity receiver comprises either a multi-user detection receiver or a multi-code detection receiver.

* * * * *